United States Patent
Hayasaka et al.

(10) Patent No.: US 11,431,496 B2
(45) Date of Patent: Aug. 30, 2022

(54) SECRET SEARCH DEVICE AND SECRET SEARCH METHOD

(71) Applicant: MITSUBISHI ELECTRIC CORPORATION, Tokyo (JP)

(72) Inventors: Kenichiro Hayasaka, Tokyo (JP); Yutaka Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 47 days.

(21) Appl. No.: 17/029,521

(22) Filed: Sep. 23, 2020

(65) Prior Publication Data

US 2021/0014057 A1    Jan. 14, 2021

Related U.S. Application Data

(63) Continuation of application No. PCT/JP2018/018737, filed on May 15, 2018.

(51) Int. Cl.
*H04L 9/08* (2006.01)

(52) U.S. Cl.
CPC ............ *H04L 9/0894* (2013.01); *H04L 9/085* (2013.01)

(58) Field of Classification Search
CPC .............................. H04L 9/0894; H04L 9/085
USPC ........................................................ 380/286
See application file for complete search history.

(56) References Cited

U.S. PATENT DOCUMENTS

| 8,111,826 B2 | 2/2012 | Takashima |
| 8,553,876 B1 * | 10/2013 | Spracklen ............... G06F 21/72 380/28 |
| 10,872,158 B2 | 12/2020 | Hayasaka et al. |
| 2009/0285386 A1 | 11/2009 | Takashima |

FOREIGN PATENT DOCUMENTS

| JP | 2007-187908 A | 7/2007 |
| JP | 2015-135452 A | 7/2015 |
| JP | 6239213 B1 | 11/2017 |
| WO | WO 2007/080633 A1 | 7/2007 |
| WO | WO 2016/113878 A1 | 7/2016 |

OTHER PUBLICATIONS

Kawai, Yutaka, et al. "SEPM: Efficient partial keyword search on encrypted data." International Conference on Cryptology and Network Security. Springer, Cham, 2015. (Year: 2015).*

(Continued)

*Primary Examiner* — Kambiz Zand
*Assistant Examiner* — Phuc Pham
(74) *Attorney, Agent, or Firm* — Birch, Stewart, Kolasch & Birch, LLP

(57) ABSTRACT

Provided is a secret search device including an arithmetic processing unit configured to speed up secret search processing by, when the secret search processing is performed by executing a pairing operation relating to each element of an encrypted tag and each element of a trapdoor, and when the pairing operation is executed by using a pre-calculation table stored in a storage unit for each element to be used in the pairing operation. The arithmetic processing unit is configured to execute, based on information on a free space usable for the pre-calculation table, size adjustment of the pre-calculation table such that the pre-calculation table fits in the free space.

5 Claims, 7 Drawing Sheets

(56) References Cited

OTHER PUBLICATIONS

Costello et al., "Fixed Argument Pairings", LATINCRYPT 2010, LNCS 6212, 2010, p. 92-108.
German Office Action for German Application No. 11 2018 007 468.4, dated Feb. 28, 2022, with English translation.
Kawai et al., "SEPM: Efficient Partial Keyword Search on Encrypted Data", International Conference on Cryptology and Network Security, CANS 2015, Cryptology and Network Security, Part of Lecture Notes in Computer Science, vol. 9476, 2015, pp. 1-25.
Kawai et al., "SEPM: Efficient Partial Keyword Search on Encrypted Data", Springer International Publishing Switzerland 2015, M. Reiter and D. Naccache (Eds.): CANS 2015, Lecture Notes in Computer Science, vol. 9476, 2015, pp. 75-91.
Poh et al., "Searchable Symmetric Encryption: Designs and Challenges", ACM Computing Surveys, vol. 50, No. 3, May 2017, pp. 1-37.

* cited by examiner

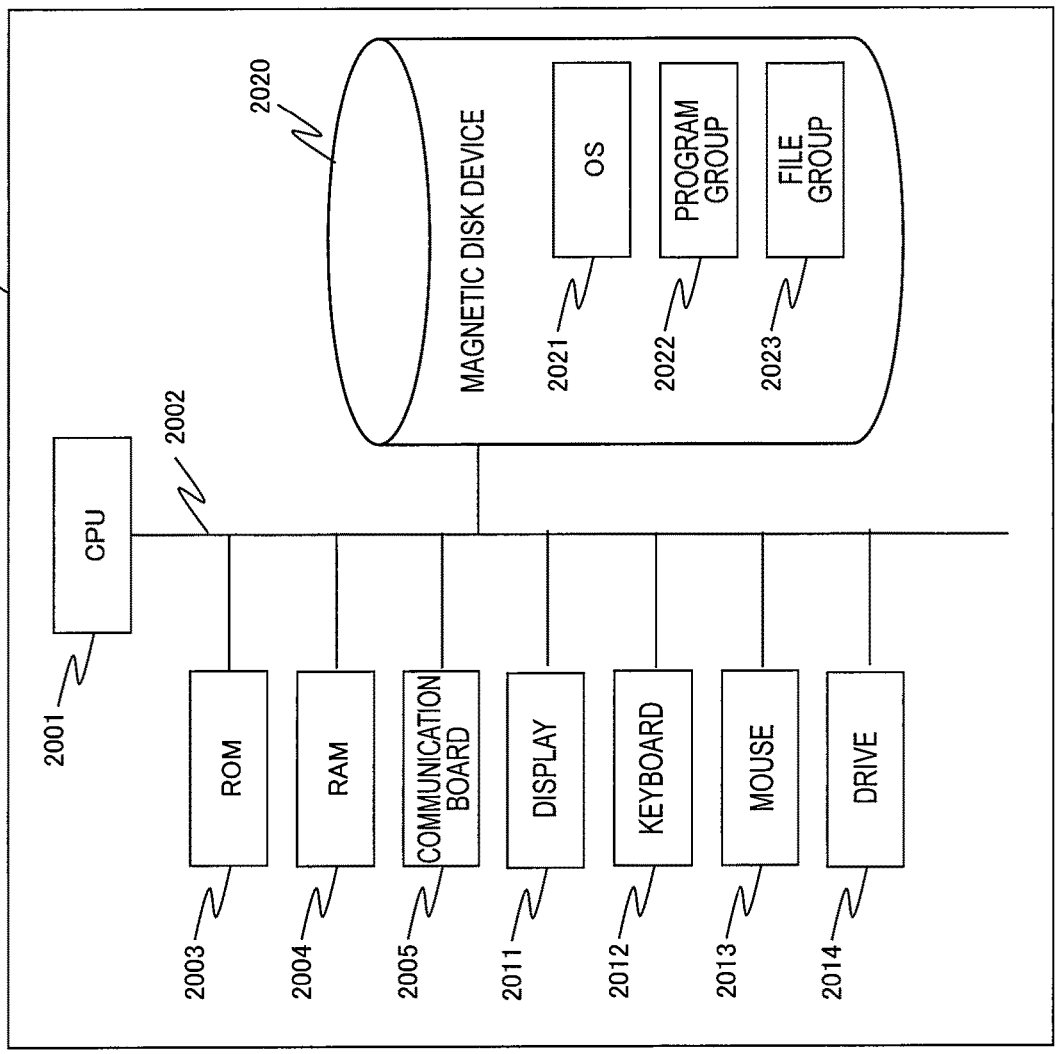

SECRET SEARCH DEVICE AND SECRET SEARCH METHOD

CROSS REFERENCE TO RELATED APPLICATIONS

This application is a Continuation of PCT International Application No. PCT/JP2018/018737 filed on May 15, 2018, which is hereby expressly incorporated by reference into the present application.

TECHNICAL FIELD

The present invention relates to a secret search device and a secret search method which are configured to perform a search under a state in which data is encrypted.

BACKGROUND ART

Secret search is a technology that allows data to be searched while the data is still encrypted. Currently, cloud services are beginning to become widespread, and the use of cloud storage that can be used at low cost and without much trouble is becoming popular.

Meanwhile, when data including sensitive information is managed in the cloud, it is required to hold the data by encrypting the data in order to avoid the risk of information leakage. Secret search is a technology of searching encrypted data without decrypting the encrypted data. Therefore, the secret search can be said to be a technology capable of achieving both security and functionality (see, for example, Patent Literatures 1 to 3 and Non Patent Literatures 1 and 2).

In the secret search, a search for encrypted data is implemented by using two encrypted keywords. The first keyword is a ciphertext of a keyword associated with the data, and is called an encrypted tag. The second keyword is a ciphertext of the keyword to be searched, and is called a trapdoor. When the data is registered, the encrypted data and the encrypted tag are registered in a storage server.

The encrypted tag is held as an encryption index in association with the data to be associated or with an identifier of the data. In the secret search, the search is implemented without exposing data and keyword information by finding the encrypted tag matching the trapdoor transmitted by the searcher from the encryption index without decrypting the data.

Such secret search can be broadly classified into a public key type secret search and a common key type secret search. Those two types of search have the following different characteristics. The public key type secret search uses different keys to generate the encrypted tag and the trapdoor, whereas the common key type secret search uses the same key to generate the encrypted tag and the trapdoor.

Moreover, in general, the public key type secret search is capable of a partial match search and flexible access control as compared with the common key type secret search, and has the advantage of being functionally superior. Meanwhile, a disadvantage of the public key type secret search is that the search speed is slower than that of the common key type secret search.

In Patent Literature 1 and Non Patent Literature 2, there are shown partial match search methods using pairing. However, the search methods described in Patent Literature 1 and Non Patent Literature 2 include a configuration in which the encrypted tag and the trapdoor are encrypted for each character. Therefore, the search methods described in Patent Literature 1 and Non Patent Literature 2 frequently repeat pairing when determining whether the encrypted tag and the trapdoor match. As a result, the search speed may be significantly delayed depending on the number of encrypted tags and trapdoors or the number or characters thereof.

Hitherto, many methods have been proposed to speed up pairing calculations. There is known a method of increasing speed, which is capable of reducing the amount of pairing calculations by using pre-calculations when a rational point on a twisted curve that is a pairing input is obtained in advance. In Non Patent Literature 2 and Patent Literature 2, such a method of increasing speed is described. Also in Patent Literature 3, a method of increasing speed is mentioned.

CITATION LIST

Patent Literature

[PTL 1] WO 2016/113878 A1
[PTL 2] JP 2015-135452 A
[PTL 3] WO 2007/080633 A1 Non Patent Literature
[NPL 1] C. Costello, D. Stebila, "Fixed Argument Pairings," LATINCRYPT 2010, LNCS 6212, pp. 92-108, 2010.
[NPL 2] Y Kawai, T. Hirano, Y Koseki, T. Munaka, "SEPM: Efficient Partial Keyword Search on Encrypted Data," CANS 2015, LNCS 9476, pp. 75-91, 2015.

SUMMARY OF INVENTION

Technical Problem

However, there are the following problems in the related art.

In the related-art method of increasing speed, as described above, which is capable of reducing the amount of pairing calculations, it is required to store tables calculated in advance. Therefore, in a secret search using many pairings, which is, for example, described in in Patent Literature 1, the search processing can be sped up by using the tables calculated in advance, but there is a problem in that storage becomes overloaded because the tables calculated in advance are held.

The present invention has been made to solve the problems described above, and it is an object of the present invention to obtain a secret search device and a secret search method, which are capable of speeding up search processing and avoiding storage device overload when a secret search is performed.

Solution to Problem

According to one embodiment of the present invention, there is provided a secret search device including an arithmetic processing unit configured to speed up secret search processing by: when a pairing operation relating to each element of an encrypted tag and each element of a trapdoor is executed and when the secret search processing is performed by using a match determination result based on the pairing operation, pre-calculating, for each element to be used in the pairing operation, an operation dependent on each element itself; storing in advance a pre-calculation table associating a pre-calculation result with each element in a storage unit; and executing the pairing operation by using the pre-calculation table, wherein the arithmetic processing unit is configured to: collect, regarding a capacity of the storage unit, information on a free space usable for the pre-calculation table; and execute, based on the collected information, size adjustment of the pre-calculation table to be stored in the storage unit such that the pre-calculation table fits in the free space.

Further, according to one embodiment of the present invention, there is provided a secret search method to be executed by an arithmetic processing unit included in a secret search device, the method including: a pre-calculation step of: executing a pairing operation relating to each element of an encrypted tag and each element of a trapdoor; pre-calculating, as pre-processing of performing secret search processing by using a match determination result based on the pairing operation, an operation dependent on each element itself for each element to be used in the pairing operation; and storing in advance a pre-calculation table associating a pre-calculation result with each element in a storage unit; an arithmetic step of speeding up the secret search processing by executing the pairing operation by using the pre-calculation table; and an information collection step of collecting, regarding a capacity of the storage unit, information on a free space usable for the pre-calculation table, wherein the arithmetic step includes executing, based on the information collected in the information collection step, size adjustment of the pre-calculation table to be stored in the storage unit such that the pre-calculation table fits in the free space.

Advantageous Effects of Invention

According to the present invention, each of the secret search device and the secret search method includes the configuration in which a part of operation results included in the pairing operations relating to the encrypted tag and the trapdoor are stored in the storage device as the pre-calculation table based on the monitoring result of the free space of the storage device, and the size of the pre-calculation table is limited based on the monitoring result of the free space of the storage device. As a result, it is possible to obtain the secret search device and the secret search method, which are capable of speeding up search processing and avoiding storage device overload when performing a secret search.

BRIEF DESCRIPTION OF DRAWINGS

FIG. 7 is a diagram for illustrating an example of hardware resources of a key generation device, the management device, the registration device, and the search device in the first embodiment of the present invention.

DESCRIPTION OF EMBODIMENTS

Figure 1:
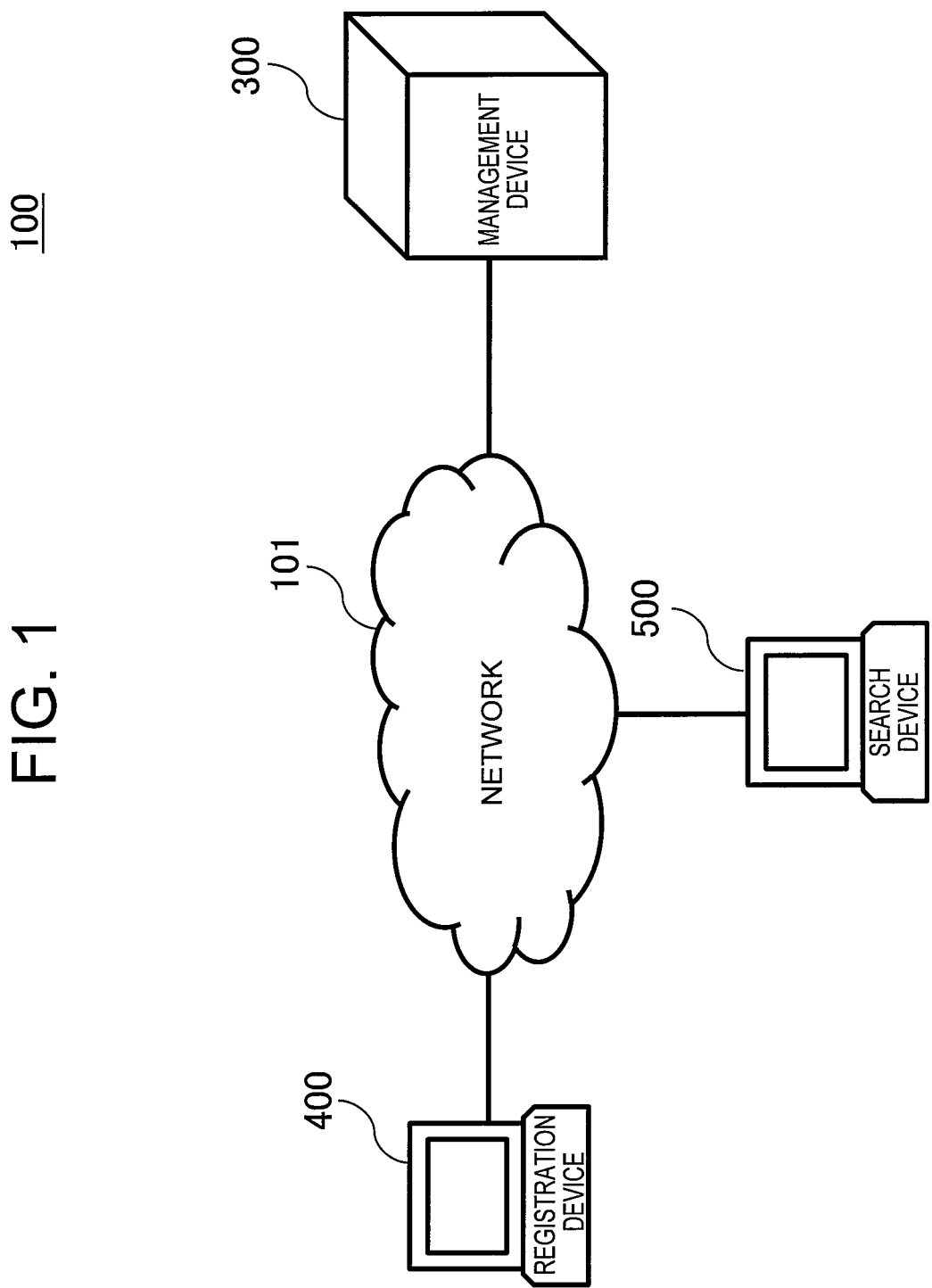
FIG. 1 is a system configuration diagram of a secret search system according to a first embodiment of the present invention.

Now, referring to the drawings, a secret search device and a secret search method according to preferred embodiments of the present invention are described. The secret search device of the present invention, which is configured to speed up search processing and to avoid storage device overload, is now specifically described based on the partial match secret search method of Non Patent Literature 2.

First Embodiment

FIG. 1 is a system configuration diagram of a secret search system 100 according to a first embodiment of the present invention. The secret search system 100 includes one or more management devices 300, one or more registration devices 400, and one or more search devices 500.

The management device 300, the registration device 400, and the search device 500 are connected to each other by the Internet 101, which is a communication channel. The Internet 101 is an example of a network, and another type of network can be used in place of the Internet 101.

The management device 300 is, for example, a computer including a large capacity storage medium. The management device 300 is configured to function as a holding device. That is, the management device 300 has a function of receiving registration encrypted data transmitted from the registration device 400 and holding data on which registration processing has been executed. The specific details of the registration processing are described in detail later with reference to a block diagram of FIG. 2 and a flowchart of FIG. 5.

The management device 300 is also configured to function as a search device. That is, the management device 300 also has a function of receiving data relating to a trapdoor transmitted from the search device 500, executing search processing, and transmitting a search result to the search device 500. The specific details of the search processing are described later in detail with reference to the block diagram of FIG. 2 and a flowchart of FIG. 6.

The registration device 400 is, for example, a PC. The registration device 400 is configured to function as a registration request device. That is, the registration device 400 has a function of generating encrypted data B(D), which is a ciphertext of the data to be registered, generating an encrypted tag C(D) by encrypting a keyword associated with the data to be registered, and transmitting the generated encrypted data B(D) and the encrypted tag C(D) to the management device 300. Specific functions of the registration device 400 are described later in detail with reference to a block diagram of FIG. 3 and the flowchart of FIG. 5.

The search device 500 is, for example, a PC. The search device 500 is configured to function as a search request device. That is, the search device 500 has a function of generating a trapdoor by encrypting a search keyword and transmitting the generated trapdoor to the management device 300. The search device 500 also functions as a search result output device. That is, the search device 500 also has a function of outputting the search result received from the management device 300. Specific functions of the search device 500 are described later in detail with reference to a block diagram of FIG. 4 and the flowchart of FIG. 6.

There may also be employed a configuration in which a combination of two or more of the management device 300, the registration device 400, and the search device 500 are simultaneously included in the same PC.

The configuration of the first embodiment is now described in more detail.

As illustrated in FIG. 1, the secret search system 100 includes the management device 300, the registration device 400, and the search device 500. The internal configurations of the management device 300, the registration device 400, and the search device 500 are now described in order with reference to the drawings.

Figure 2:
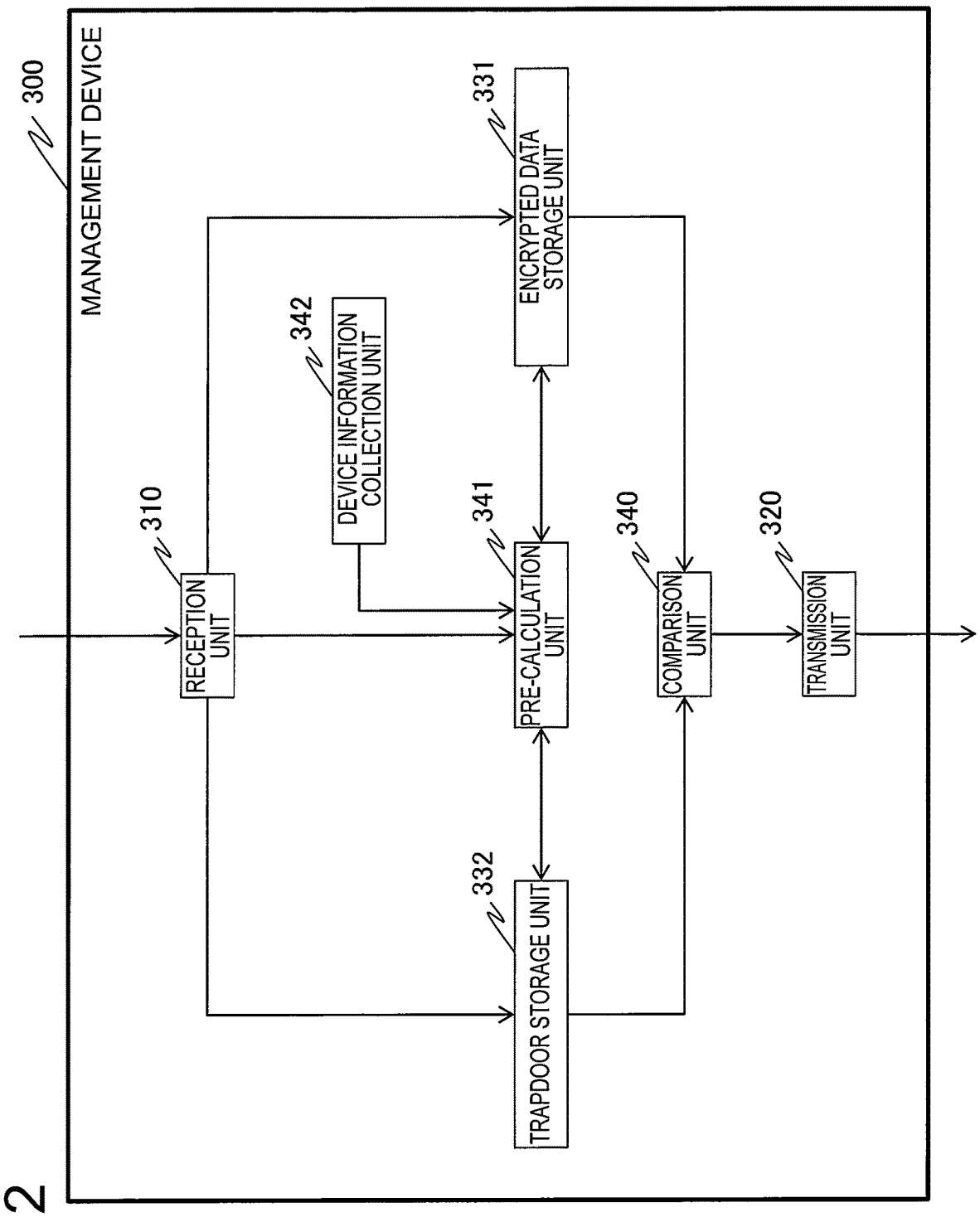
FIG. 2 is a block diagram for illustrating a configuration of a management device in the first embodiment of the present invention.

First, the management device 300 is described. FIG. 2 is a block diagram for illustrating the configuration of the management device 300 in the first embodiment of the present invention. As illustrated in FIG. 2, the management device 300 includes a reception unit 310, a transmission unit 320, an encrypted data holding unit 331, a trapdoor holding unit 332, a comparison unit 340, a pre-calculation unit 341, and a device information collection unit 342. The management device 300 further includes a storage medium (not shown) configured to store the data to be used by each of the units of the management device 300.

The reception unit 310 is configured to receive encrypted data B(D) and registration encrypted data R(D) to be described later from the registration device 400, and to receive a trapdoor from the search device 500. The transmission unit 320 is configured to transmit a search result to the search device 500.

The pre-calculation unit 341 is configured to calculate a pre-calculation table in order to speed up search processing in the comparison unit 340. Specifically, the pre-calculation unit 341 calculates a pre-calculation table for the registration encrypted data R(D) acquired from the reception unit 310 and a pre-calculation table for a trapdoor t(s) acquired from the reception unit 310.

At this time, the pre-calculation unit 341 can receive, from the device information collection unit 342, information on a free space of the storage medium holding an encryption index I and a free space of the storage medium holding the trapdoor t(s), and adjust the size of the pre-calculation table.

The encrypted data holding unit 331 is configured to add the registration encrypted data R(D) received by the reception unit 310 to the encryption index I to hold the registration encrypted data. At the same time, the encrypted data holding unit 331 may also, as required, hold a date and time at which the registration encrypted data R(D) is transmitted, for example. Moreover, the encrypted data holding unit 331 receives from the pre-calculation unit 341 the pre-calculation table calculated for the registration encrypted data R(D), and adds the pre-calculation table to the encryption index I to hold the pre-calculation table.

The reception unit 310 can receive a deletion data name. In this case, the encrypted data holding unit 331 deletes the data identified by the deletion data name from the encryption index I.

The trapdoor holding unit 332 is configured to hold the trapdoor t(s) received by the reception unit 310. Moreover, the trapdoor holding unit 332 receives from the pre-calculation unit 341 the pre-calculation table calculated for the trapdoor t(s), and adds the pre-calculation table to the trapdoor t(s) to hold the pre-calculation table.

The comparison unit 340 is configured to calculate a search result S(s) based on the trapdoor t(s) received from the trapdoor holding unit 332 and the encryption index I received from the encrypted data holding unit 331, to thereby output the search result S(s) to the transmission unit 320.

Figure 3:
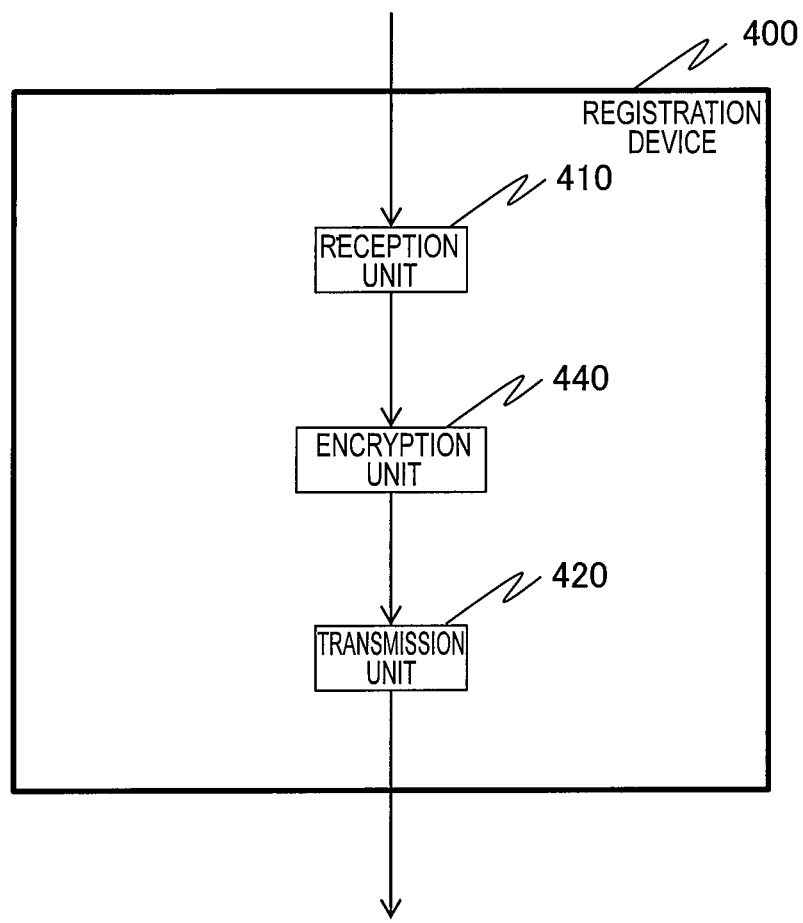
FIG. 3 is a block diagram for illustrating a configuration of a registration device in the first embodiment of the present invention.

Next, the registration device 400 is described. FIG. 3 is a block diagram for illustrating the configuration of the registration device 400 in the first embodiment of the present invention. As illustrated in FIG. 3, the registration device 400 includes a reception unit 410, a transmission unit 420, and an encryption unit 440. The registration device 400 further includes a storage medium (not shown) configured to store the data to be used by each of the units of the registration device 400.

The reception unit 410 is configured to receives data D, a data name ID(D), and a keyword group W(D) associated with the data as inputs from a data registrant. The reception unit 410 can receive, as required, the name of data to be deleted as an input from the data registrant.

The encryption unit 440 is configured to receive the data D, the data name ID(D), and the keyword group W(D) from the reception unit 410, and to generate encrypted data B(D) and an encrypted tag C(D). The encryption unit 440 also generates a set (ID(D), C(D)) of the data name ID(D) and the encrypted tag C(D). The generated set (ID(D), C(D)) corresponds to the registration encrypted data R(D).

The transmitting unit 420 is configured to transmit the encrypted data B(D) and the registration encrypted data R(D) received from the encryption unit 440 to the management device 300. The transmission unit 420 can also transmit a name of registered data to be deleted as a deletion data name to the management device 300.

Figure 4:
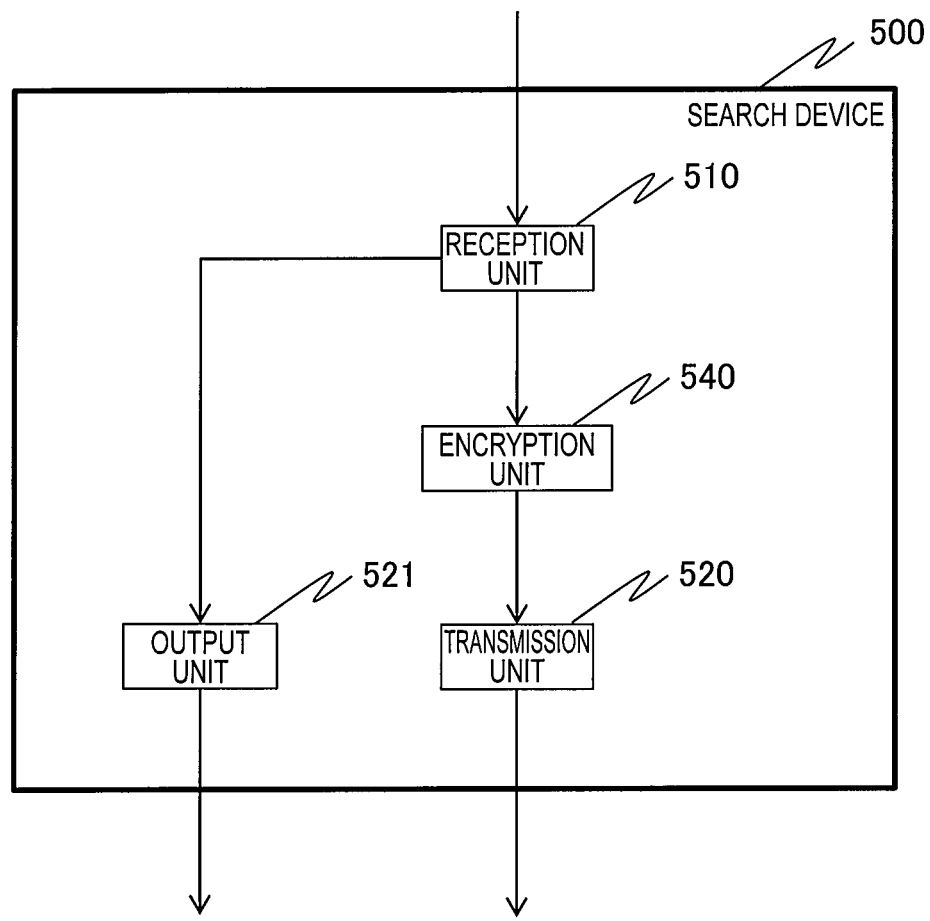
FIG. 4 is a block diagram for illustrating a configuration of a search device in the first embodiment of the present invention.

Next, the search device 500 is described. FIG. 4 is a block diagram for illustrating the configuration of the search device 500 in the first embodiment of the present invention. As illustrated in FIG. 4, the search device 500 includes a reception unit 510, a transmission unit 520, an output unit 521, and an encryption unit 540. The search device 500 further includes a storage medium (not shown) configured to store the data to be used by each of the units of the search device 500.

The reception unit 510 is configured to receive a search keyword s as an input from a data searcher. The reception unit 510 also receives the search result S(s) transmitted from the management device 300.

The encryption unit 540 is configured to generate the trapdoor t(s) from the search keyword s received from the reception unit 510. The transmission unit 520 transmits the trapdoor t(s) generated by the encryption unit 540 to the management device 300.

The output unit 521 is configured to output the search result S(s) received from the reception unit 510 to the data searcher.

Next, specific operations of the registration processing and the search processing to be executed in the secret search device according to the first embodiment are described with reference to flowcharts. As a precondition, it is assumed that the registration device 400 has, by some method, acquired and stored in advance the key required for generating the registration encrypted data R(D). Further, it is assumed that the search device 500 has, by some method, acquired and stored in advance the key required for generating the trapdoor t(s). Moreover, it is assumed that the management device 300 has, by some method, acquired and stored in advance the key required for converting the trapdoor t(s). Those keys (which are not shown in FIG. 1) can be generated by a key generation device 200. The hardware resources of the key generation device 200 are described later with reference to FIG. 7.

Figure 5:
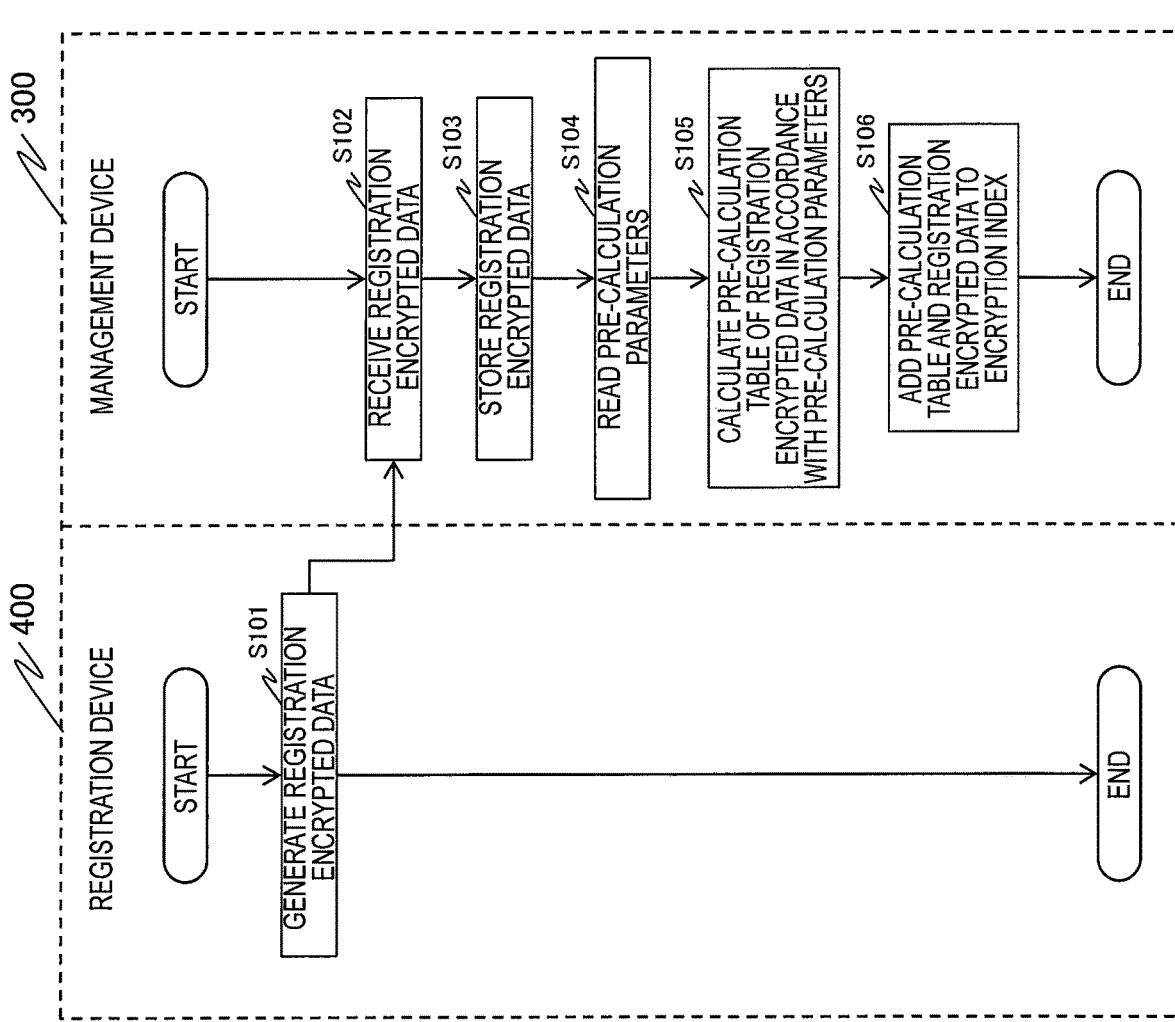
FIG. 5 is a flowchart for illustrating registration processing by the management device and the registration device in the first embodiment of the present invention.

First, the registration processing is described. FIG. 5 is a flowchart for illustrating the registration processing to be executed by the management device 300 and the registration device 400 in the first embodiment of the present invention. In Step S101, the registration device 400 generates registration encrypted data R(D) and encrypted data B(D) from the data D, and transmits the generated data to the management device 300.

When generating the registration encrypted data R(D), the registration device 400 receives the data D, the data name ID(D), and the keyword group W(D) as inputs, and then performs the following processing. That is, the registration device 400 generates w1, w2, . . . , wn by taking one element of the keyword group W(D) as a keyword w, and dividing the keyword w into n pieces. The division may be performed for each character or each word. The value of n may be different for each keyword w.

First, the registration device 400 generates a ciphertext ct(w)=(c0, c1, . . . , cn, I) for all keywords w. In this case, c1, c2, . . . , cn are ciphertexts of the divided partial keywords w1, w2, . . . , wn. A group of all the ciphertexts ct(w) for the keyword group W(D) is referred to as an encrypted tag C(D). From the above-mentioned method, the registration device 400 generates registration encrypted data R(D)=(ID(D), C(D)).

The registration device 400 also encrypts the data D to generate encrypted data B(D). As the encryption method for generating the encrypted data B(D), for example, common key encryption, for example, AES, may be used, or ID-based encryption, attribute-based encryption, or the like may be used.

Next, in Step S102, the reception unit 310 of the management device 300 receives the registration encrypted data R(D) from the registration device 400. In Step S103, the encrypted data holding unit 331 of the management device 300 holds the registration encrypted data R(D) received by the reception unit 310 in Step S102.

In Step S104, the pre-calculation unit 341 of the management device 300 reads pre-calculation parameters from the device information collection unit 342. The pre-calculation unit 341 may also receive the pre-calculation parameters from the reception unit 310. The pre-calculation parameters p=(p1, p2, p3, p4, . . . ) are a group of parameters including information such as a maximum pre-calculation amount p1, a minimum pre-calculation amount p2, a maximum usable storage capacity p3, and a pre-calculation mode p4-.

The maximum pre-calculation amount p1 is, for example, a real number of 0 or more and 1 or less, and represents an upper limit of the pre-calculation amount per pairing as a ratio. Similarly, the minimum pre-calculation amount p2 is, for example, a real number of 0 or more and 1 or less, and represents a lower limit of the pre-calculation amount per pairing as a ratio. The maximum usable storage capacity p3 is an upper limit of the storage capacity that can be used for holding the pre-calculation tables of the entire encrypted index I.

The pre-calculation mode p4 is a mode for defining a policy for allocating the pre-calculation amounts to the ciphertexts c0, c1, . . . , cn of the partial keywords. For example, among the ciphertexts of the partial keywords, c0 and cn positioned at the ends are input once to the match determination processing, that is, the pairing processing, but ci positioned in the middle is input in the pairing processing a larger number of times than the ciphertexts at the ends.

In this way, by allocating more pre-calculation amounts to the ciphertexts that are input a large number of times in the pairing processing, it is possible to speed up the search processing and improve storage capacity efficiency. That is, by defining the policy of allocating the pre-calculation amounts in the pre-calculation mode p4, it is possible to speed up the search processing and to improve storage capacity efficiency.

In Step S105, the pre-calculation unit 341 of the management device 300 generates a pre-calculation table for the registration encrypted data R(D) based on the registration encrypted data R(D) held by the encrypted data holding unit 331 in Step S103 and the pre-calculation parameters read in Step S104. The pre-calculation table may be generated during search processing in place of generating the pre-calculation table during registration processing, and may be used in the search processing from the next time and the subsequent times.

In Step S106, the encrypted data holding unit 331 of the management device 300 adds the pre-calculation table generated by the pre-calculation unit 341 in Step S105 to the encrypted index I in association with the registration encrypted data R(D). As a result of this Step S106, the series of processes in the registration processing by the management device 300 is finished.

Figure 6:
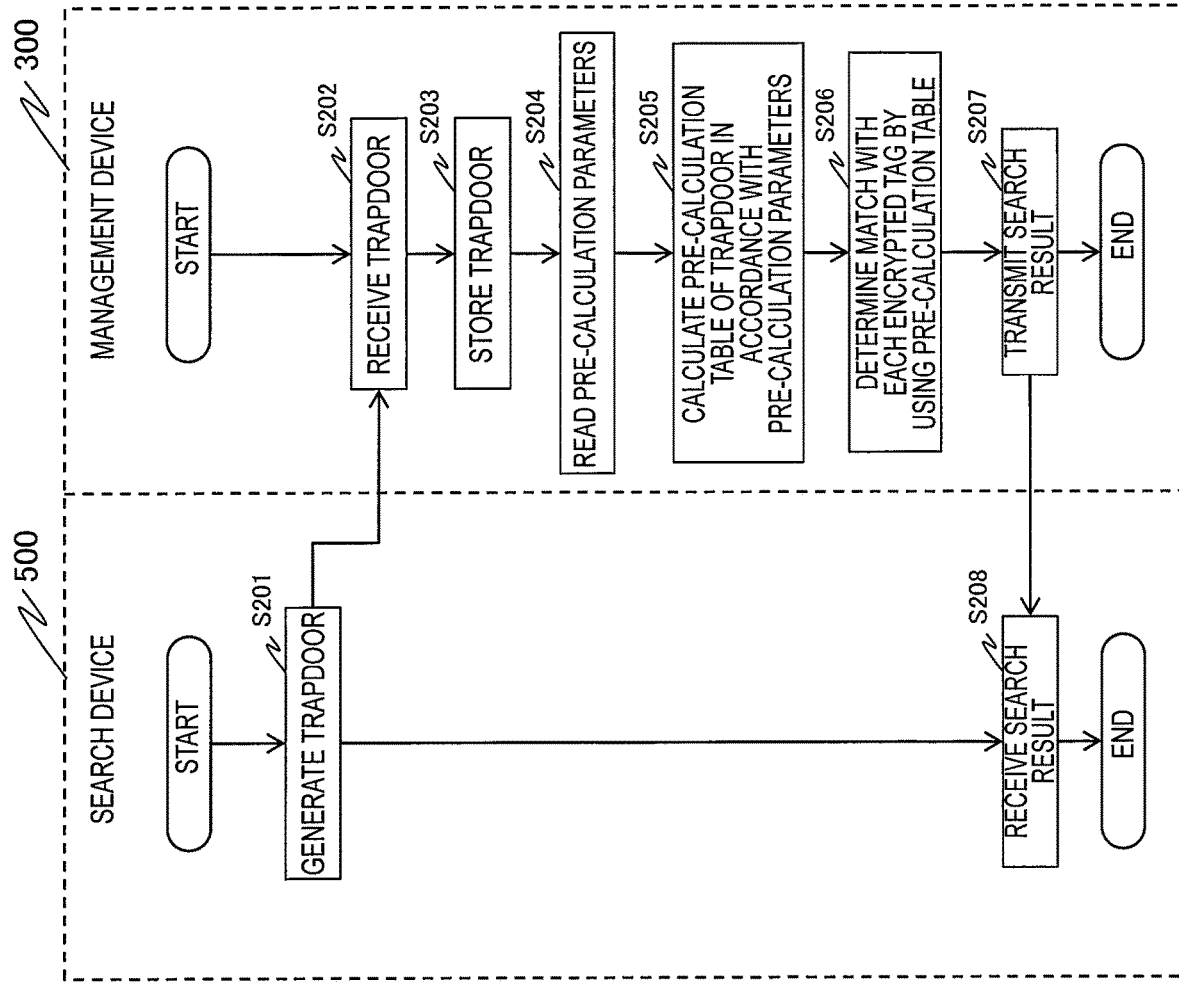
FIG. 6 is a flowchart for illustrating search processing by the management device and the search device in the first embodiment of the present invention.

Next, the search processing is described. FIG. 6 is a flowchart for illustrating the search processing to be executed by the management device 300 and the search device 500 in the first embodiment of the present invention. In Step S201, the search device 500 generates a trapdoor t(s) from the search keyword s, and transmits the generated trapdoor t(s) to the management device 300.

When generating the trapdoor t(s), the search device 500 receives the search keyword s as an input and then performs the following processing. That is, the search device 500 divides a search keyword s into m pieces as s1, s2, . . . , sm. This division may be performed for each character or each word. Further, the value of m may be different for each search keyword s.

The search device 500 generates a trapdoor t(s)=(k0, k1, k2, . . . , Km, I) for the divided search keywords s1, s2, . . . , sm. Here, k1, k2, . . . , Km are ciphertexts of the divided partial keywords s1, s2, . . . , sm.

Next, in Step S202, the reception unit 310 of the management device 300 receives the trapdoor t(s) from the search device 500. In Step S203, the trapdoor holding unit 332 of the management device 300 holds the trapdoor t(s) received by the reception unit 310 in Step S202.

In Step S204, the pre-calculation unit 341 of the management device 300 reads pre-calculation parameters from the device information collection unit 342. The pre-calculation unit 341 may also receive the pre-calculation parameters from the reception unit 310.

In Step S205, the pre-calculation unit 341 of the management device 300 generates a pre-calculation table for the trapdoor t(s) based on the trapdoor t(s) held by the trapdoor holding unit 332 in Step S203 and the pre-calculation parameters read in Step S204.

In Step S206, the comparison unit 340 of the management device 300 uses the pre-calculation table generated by the pre-calculation unit 341 in Step S205, the trapdoor t(s) held by the trapdoor holding unit 332, and the encryption index I held by the encrypted data holding unit 331 to determine whether the trapdoor t(s) and the encrypted tag C(D) match each other. At this time, when the encryption index I includes a pre-calculation table associated with the registration encrypted data R(D), the comparison unit 340 can also use the pre-calculation table for the registration encrypted data R(D) to speed up the match determination processing.

Next, the comparison unit 340 transmits the obtained match determination result as a search result to the transmitting unit 320 of the management device 300. After Step S206 ends, the comparison unit 340 may delete the trapdoor t(s) and the pre-calculation table calculated for the trapdoor t(s) from the trapdoor holding unit 332.

In Step S207, the transmission unit 320 of the management device 300 transmits the search result received from the comparison unit 340 to the search device 500. As a result of Step S207, the series of processes in the search processing by the management device 300 is finished.

Meanwhile, in Step S208, the search device 500 receives the search result from the management device 300, and outputs the received search result to the data searcher. As a result of Step S208, the series of processes in the search processing by the search device 500 is finished.

The above-mentioned secret search in the first embodiment may be summarized as follows.

The encrypted tag and trapdoor are ciphertexts of characters, and are vectors of rational points (that is, elliptic points) on an elliptic curve. The secret search in the first embodiment is a partial match search method using pairing, in which a determination regarding whether the encrypted tag C(D) and the trapdoor t(s) match each other is performed by performing a pairing operation between each element forming the encrypted tag C(D) and each element forming the trapdoor t(s). Therefore, many pairing operations are required in order to perform the match determination.

The pairing operation is performed on two elliptic points. However, a calculation depending only on one elliptic point exists for this pairing operation. Therefore, the secret search device according to the first embodiment executes a calculation depending only on one elliptic point as a pre-calculation, and stores the result in a storage unit as a pre-calculation table associated with the elliptic point.

Therefore, regarding the elliptic points to be used for the pairing operation in the secret search, when a pre-calculation table already exists, it is possible to speed up the arithmetic processing by utilizing that pre-calculation table.

However, when there are more elliptic points, the memory size for storing the pre-calculation table also increases. Therefore, it is required to create the pre-calculation table within an acceptable limited memory size. As a result, the secret search in the first embodiment includes a configuration in which the free space that is usable for the pre-calculation table is monitored, and the size of the pre-calculation table is adjusted based on the monitoring result.

For example, the management device 300 can identify or select a character position that is frequently compared by pairing, and adjust the size of the pre-calculation table such that a pre-calculation table relating to the character position is preferentially generated. Conversely, the management device 300 can adjust the pre-calculation table such that the size of the pre-calculation table relating to a character position that is difficult to be determined as a match or a character position that is less frequently input in pairing processing is smaller.

As a result, when the secret search is performed, it is possible to achieve a device that can speed up search processing and avoid storage device overload.

Next, the hardware configuration of each of the key generation device 200, the management device 300, the registration device 400, and the search device 500 is described with reference to the drawings. FIG. 7 is a diagram for illustrating an example of the hardware resources of the key generation device 200, the management device 300, the registration device 400, and the search device 500 in the first embodiment of the present invention. In FIG. 7, the key generation device 200, the management device 300, the registration device 400, and the search device 500 each include a central processing unit (CPU) 2001.

The CPU 2001 is connected, via a bus 2002, to hardware devices such as a ROM 2003, a RAM 2004, a communication board 2005, a display 2011 (display device), a keyboard 2012, a mouse 2013, a drive 2014, and a magnetic disk device 2020. The CPU 2001 is configured to control those hardware devices.

The drive 2014 is a device configured to read and write to and from a storage medium such as a flexible disk drive (FD), a compact disc (CD), and a digital versatile disc (DVD). The ROM 2003, the RAM 2004, the drive 2014, and the magnetic disk device 2020 correspond to a storage device or a storage unit.

The keyboard 2012, the mouse 2013, and the communication board 2005 are examples of input devices. The display 2011 and the communication board 2005 are examples of output devices.

The communication board 2005 is connected, with a cable or wirelessly, to a communication network such as a local area network (LAN), the Internet, or a telephone line.

The magnetic disk device 2020 stores an operating system (OS) 2021, a program group 2022, and a file group 2023.

The program group 2022 includes programs configured to execute the functions of the function blocks of FIG. 2 to FIG. 4 described as " . . . unit" in the first embodiment. For example, programs such as a data search program and a data registration program are read from the program group 2022 and executed by the CPU 2001. That is, the programs cause the computer to function as the " . . . unit", and also cause the computer to execute the procedure and method of the " . . . unit".

The file group 2023 includes the various pieces of data (for example, inputs, outputs, determination results, calculation results, and processing results) to be used by the " . . . unit" described in the first embodiment. The arrows included in the configuration diagrams and flowcharts in the first embodiment mainly indicate inputs and outputs of data and signals.

The processing of the first embodiment described with reference to the block diagrams and flowcharts is executed by using hardware such as the CPU 2001, the storage device, the input devices, and the output devices.

Each component described as a " . . . unit" in this embodiment may be a " . . . circuit", a " . . . device", or a " . . . machine", or may be a " . . . step", a " . . . procedure", or " . . . processing". That is, description referring to a " . . . unit" may be implemented by any one of firmware, software, and hardware, or a combination thereof.

As described above, according to the first embodiment, the following effects are achieved.

(Effect 1) Faster Search Processing

The secret search device according to the first embodiment includes the configuration in which a part of the operations included in the pairing operation are pre-calculated in relation to the encrypted tag and the trapdoor. As a result, it is possible to speed up the pairing performed in the match determination processing, to thereby speed up the search processing.

(Effect 2) Avoidance of Storage Device Overload

The secret search device according to the first embodiment includes the configuration in which the storage and memory size are monitored, and the pre-calculation amount is adjusted. As a result, capacity overload of the storage device can be avoided by controlling the size of the pre-calculation table in accordance with the free space of the storage medium. Further, the secret search device according to the first embodiment includes the configuration in which the size of the pre-calculation table is adjusted in accordance with the character position of the keyword. As a result, the size of the pre-calculation table can be efficiently controlled.

REFERENCE SIGNS LIST 100 secret search system, 300 management device, 400 registration device, 500 search device, 2001 CPU (central processing unit), 2020 magnetic disk device (storage unit)

The invention claimed is:

1. A secret search device, comprising an arithmetic processor configured to speed up secret search processing by: when a pairing operation relating to each element of an encrypted tag and each element of a trapdoor is executed and when the secret search processing is performed by using a match determination result based on the pairing operation, pre-calculating, for each element to be used in the pairing operation, an operation dependent on each element itself; storing in advance a pre-calculation table associating a pre-calculation result with each element in a memory; and executing the pairing operation by using the pre-calculation table, wherein the arithmetic processor is configured to:
collect, regarding a capacity of the memory, information on a free space usable for the pre-calculation table;
execute, based on the collected information on the free space usable for the pre-calculation table, size adjustment of the pre-calculation table to be stored in the memory such that the pre-calculation table fits in the free space; and
monitor the memory and the usable free space to facilitate the execution of the size adjustment of the pre-calculation table to be stored in the memory so as to prevent an overload of the memory when the secret search processing is performed.

2. The secret search device according to claim 1, wherein the arithmetic processor is configured to:
identify an execution count of the pairing processing from a character position of each element; and
execute the size adjustment such that the size of the pre-calculation table corresponding to an element having a large identified execution count is increased, and the size of the pre-calculation table corresponding to an element having a small identified execution count is reduced.

3. The secret search device according to claim 1, wherein the arithmetic processor is configured to execute the pairing operation by applying a partial match search method.

4. The secret search device according to claim 2, wherein the arithmetic processor is configured to execute the pairing operation by applying a partial match search method.

5. A secret search method to be executed by an arithmetic processor included in a secret search device, the method comprising:
executing a pairing operation relating to each element of an encrypted tag and each element of a trapdoor;
pre-calculating, as pre-processing of performing secret search processing by using a match determination result based on the pairing operation, an operation dependent on each element itself for each element to be used in the pairing operation; and storing in advance a pre-calculation table associating a pre-calculation result with each element in a memory;
speeding up the secret search processing by executing the pairing operation by using the pre-calculation table; and
collecting, regarding a capacity of the memory, information on a free space usable for the pre-calculation table,
wherein the speeding includes:
executing, based on the information collected in the collecting on the free space usable for the pre-calculation table, size adjustment of the pre-calculation table to be stored in the memory such that the pre-calculation table fits in the free space, and
monitoring the memory and the usable free space to facilitate the execution of the size adjustment of the pre-calculation table to be stored in the memory so as to prevent an overload of the memory when the secret search processing is performed.

* * * * *